United States Patent
Park

(10) Patent No.: US 6,445,673 B2
(45) Date of Patent: Sep. 3, 2002

(54) OPTICAL PICK-UP FEEDING DEVICE

(75) Inventor: Hee-deuk Park, Sungnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/193,254

(22) Filed: Nov. 17, 1998

(30) Foreign Application Priority Data

Nov. 28, 1997 (JP) ............................................. 97-64071

(51) Int. Cl.[7] .............................. G11B 7/08; G11B 21/02
(52) U.S. Cl. ...................................... 369/219; 369/249
(58) Field of Search ................................ 369/215, 219, 369/244, 249, 255, 220, 221; 360/105, 106, 109, 267.3, 267.5, 267.6, 267.7

(56) References Cited

U.S. PATENT DOCUMENTS

| | | | | |
|---|---|---|---|---|
| 4,996,619 A | * | 2/1991 | Negishi et al. | 360/109 |
| 5,764,618 A | * | 6/1998 | Kim | 369/219 |
| 5,768,248 A | * | 6/1998 | Lee | 369/219 |
| 5,889,755 A | * | 3/1999 | Kim | 369/219 |
| 5,995,478 A | * | 11/1999 | Park | 369/219 |
| 5,995,479 A | * | 11/1999 | Takizawa et al. | 369/219 |
| 6,044,057 A | * | 3/2000 | Park et al. | 369/219 |

FOREIGN PATENT DOCUMENTS

| | | | | |
|---|---|---|---|---|
| GB | 2217094 | * | 10/1989 | 369/219 |
| JP | 60-219692 | * | 11/1985 | 369/223 |
| JP | 63-188831 | * | 8/1988 | |
| JP | 2-94115 | | 4/1990 | |
| JP | 2-60755 | | 5/1990 | |
| JP | 4-109433 | * | 4/1992 | |
| JP | 9-161277 | | 6/1997 | |
| JP | 9-198687 | | 7/1997 | |
| JP | 10-105981 | | 4/1998 | |
| JP | 10-105982 | | 4/1998 | |
| JP | 10-116479 | | 5/1998 | |
| JP | 11-25466 | | 1/1999 | |

* cited by examiner

*Primary Examiner*—David L. Ometz
(74) *Attorney, Agent, or Firm*—Staas & Halsey LLP

(57) ABSTRACT

An optical pick-up feeding device for easily adjusting an optical pick-up device to be perpendicular with respect to a surface of an optical disc. The optical pick-up feeding device includes a feeding section to feed the optical pick-up device, a guiding section to guide the optical pick-up device while it is fed by the feeding section, and an adjusting section to adjust the guiding section so that the optical axis of the optical pick-up device is perpendicular with respect to the surface of the optical disc. The feeding section has a lead screw to feed the optical pick-up device and a stepping motor to rotate the lead screw. The guiding section has a pair of guide shafts, and is adjusted by adjusting holders engaged with each end of one of the guide shafts and one end of the other guide shaft. Also, the optical axis of the optical pick-up device is adjusted to be perpendicular with respect to the surface of disc so that the recording/reproducing of data thereto/therefrom by an optical disc player is smoothly performed. Advantages are apparent in that the perpendicularity of the optical axis of the pick-up device is easily adjusted, vibration of the optical pick-up device is prevented, and the optical pick-up device is accurately positioned at an expected position to access the optical disc.

20 Claims, 6 Drawing Sheets

OPTICAL PICK-UP FEEDING DEVICE

CROSS-REFERENCE TO RELATED APPLICATIONS

This application claims the benefit of Korean Application No. 97-64071, filed Nov. 28, 1997, in the Korean Patent Office, the disclosure of which is incorporated herein by reference.

BACKGROUND OF THE INVENTION

1. Field of the Invention

The present invention relates to an optical disc player, and more particularly to an apparatus for feeding a pick-up device in a radial direction of an optical disc.

2. Description of the Related Art

A Digital Versatile Disc (DVD) such as an optical disc is a recording medium for recording/reproducing information (data) into/from concentric tracks. Such an optical disc is loaded on a turntable by a disc loading device and is then rotated by a rotating device. While being rotated, an optical pick-up device travels in a radial direction of the optical disc and projects a laser beam onto the disc track. As a result, the information is recorded/reproduced to/from the disc.

FIG. 1 and FIG. 2 show a conventional optical pick-up feeding device for feeding an optical pick-up device 16. As it is shown, a spindle motor 12 is installed on an upper surface of a deck base having an opening 10a. The spindle motor 12 is provided with the turntable 14 by being mounted thereon.

In addition, the deck base 10 is installed with the optical pick-up feeding device thereon which feeds the optical pick-up device 16 in a radial direction of the optical disc (not shown). The optical pick-up feeding device includes a driving motor 18 installed at the side of the deck base 10, a lead screw 24 for feeding the optical pick-up device 16 by being rotated by the driving motor 18, and a guide shaft for guiding the optical pick-up device 16.

The lead screw 24 and the guide shaft 28 are installed on the deck base 10 by a plurality of fixing members 30 in such a manner that both are spaced in a parallel relationship with each other. The guide shaft 28 is fixed on the deck base 10 with both ends fixed by a plurality of the fixing members 30. And the lead screw 24 is fixed on the deck base 10 by a fixing member 30 fixing one end thereof. The lead screw 24 is rotated by a driving gear 20 mounted on an axis of the driving motor 18 and a driven gear 22 engaged with the lead screw 24. At this instance, the optical pick-up device 16 is fed along the guide shaft 28 in a radial direction of the optical disc from the opening 10a, while recording/reproducing the data to/from the optical disc. More specifically, a laser beam is projected from optical pick-up device 16. An optical axis of the laser beam should be in a vertical (perpendicular) relationship with respect to the surface of the optical disc which is loaded on the turn table 14.

However, in case the fixing members 30 on the deck base 10 are of wrong sizes, and/or the spindle motor 12 is assembled with error, the optical axis is deviated from the perpendicular relationship with the surface of the optical disc. Consequently, data can not be recorded/reproduced to/from the optical disc properly. Furthermore, in case the lead screw 24 and guide shaft 28 deviate from the state of parallelism, problems arise as the optical axis of the optical pick-up device 16 to be perpendicular with respect to the surface of the optical disc, and adjusting the parallelism of the guide shaft 28 in relation to the lead screw 24 is required.

In addition, a DC servo motor employed as a driving motor generates vibration when the optical pick-up device is fed. As a result, the optical pick-up device 16 cannot be precisely positioned at the expected position to access the optical disc.

SUMMARY OF THE INVENTION

The present invention has been provided to overcome the above problems, and accordingly, it is an object of the present invention to provide an optical pick-up feeding device for adjusting an optical axis of an optical pick-up device to be perpendicular with respect to a surface of an optical disc, and adjusting a parallelism of lead screw and guide shafts easily so that the feeding the optical pick-up device radially along the optical disc as well as recording/reproducing data to/from the optical disc are smoothly performed, vibration of the optical pick-up device generated while the latter is fed is reduced, and the optical pick-up device is positioned at the exact position to access the optical disc.

Additional objects and advantages of the invention will be set forth in part in the description which follows and, in part, will be obvious from the description, or may be learned by practice of the invention.

To achieve the above and other objects of the present invention, an optical pick-up feeding device including an optical pick-up device movably mounted on a deck base, a feeding section for feeding the optical pick-up device, a guiding section for guiding the optical pick-up device, and an adjusting section for adjusting an optical axis of the optical pick-up device to be a perpendicular relationship with respect to a surface of an optical disc.

The guiding section includes a pair of guide shafts connected to the optical pick-up device such that the optical pick-up device is fed therealong. The guide shafts are installed on the deck base while being spaced in parallel with each other by a predetermined distance.

The adjusting section includes adjusting holders rotatably installed on the deck base. The adjusting holders are formed with adjusting holes in spiral shape whereinto ends of the guide shafts are respectively inserted. Through the rotation of the adjusting holders, the guide shafts are raised or lowered.

The feeding section includes a lead screw engaged with a side of the optical pick-up device and a stepping motor for rotating the lead screw. The side of the optical pick-up device is engaged with the lead screw, and the optical pick-up device is fed by the rotation of the stepping motor.

According to an aspect of the present invention, the optical pick-up feeding device has advantages that the optical axis of optical pick-up device is easily adjusted to be perpendicular with respect to the surface of the optical disc while parallelism of the guide shafts is also adjusted easily. In addition, the optical pick-up device is not vibrated during the feeding process thereof, and is precisely fed to an expected position for access to the optical disc.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
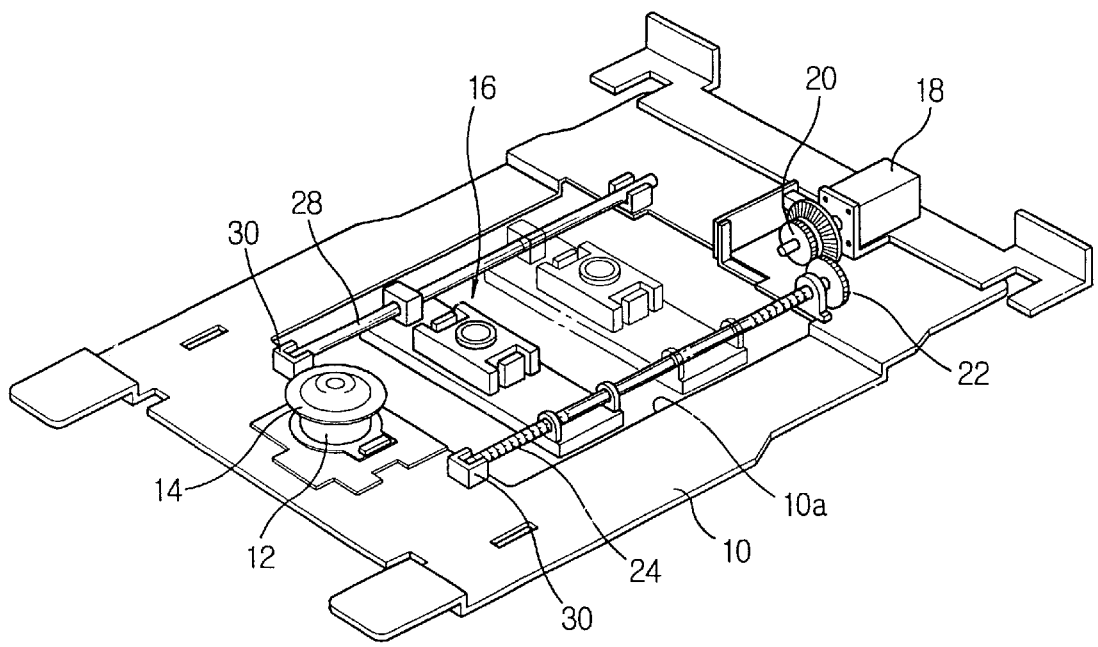
FIG. 1 is a perspective view showing a conventional deck base and an optical pick-up feeding device.
Figure 2:
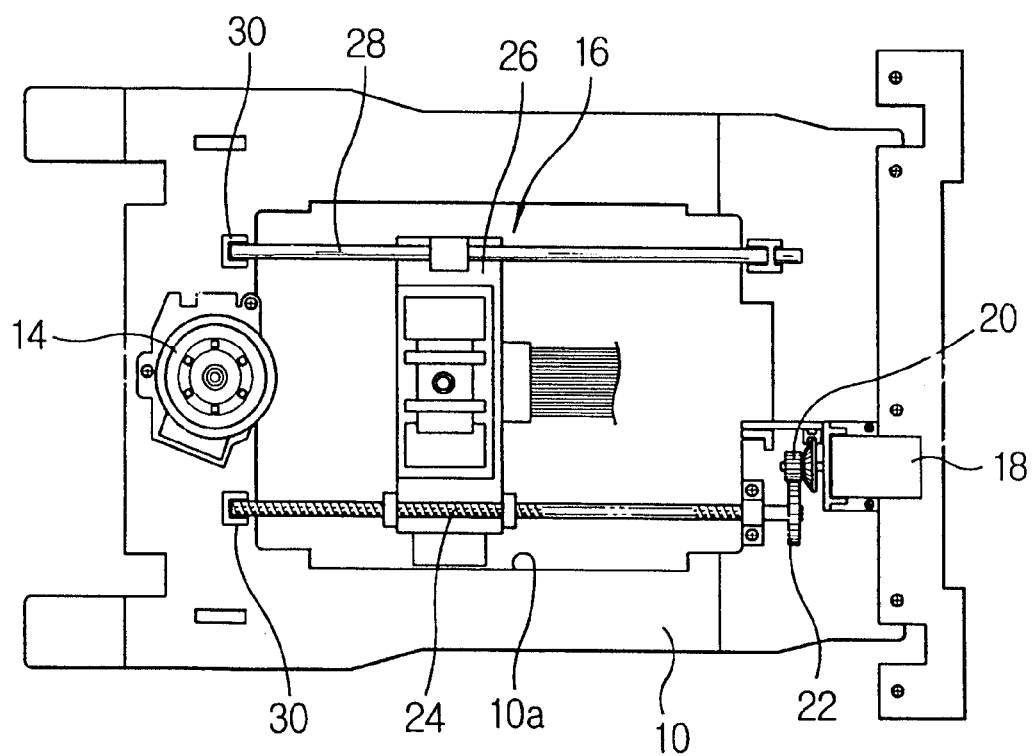
FIG. 2 is a plan view showing the deck base and the optical pick-up feeding device of FIG. 1.

Reference will now made in detail to the present preferred embodiment of the present invention, examples of which are illustrated in the accompanying drawings, wherein like reference numerals refer to the like elements throughout. The embodiments are described below in order to explain the present invention by referring to the figures.

Figure 3:
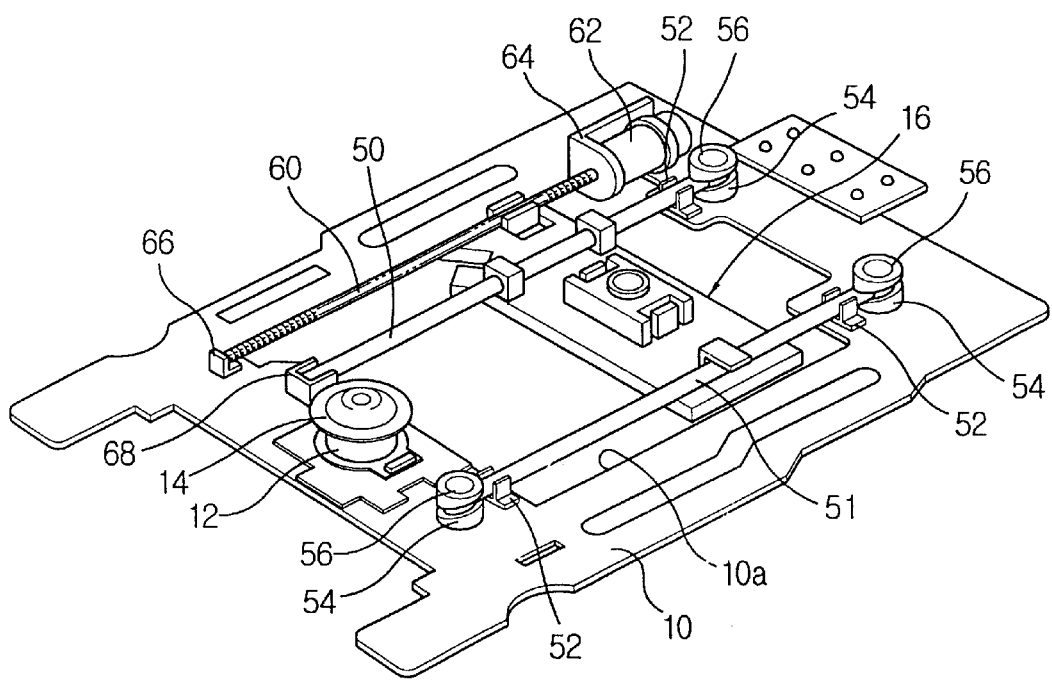
FIG. 3 is a perspective view showing an optical pick-up feeding device according to an embodiment of the present invention.
Figure 5:
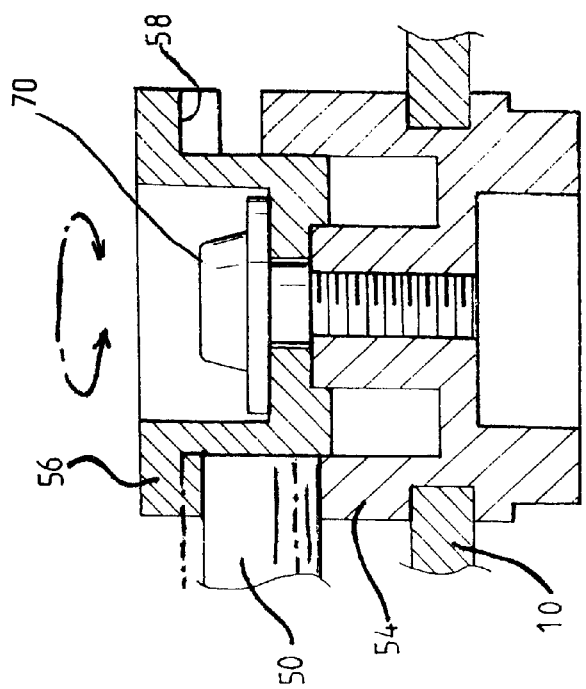
FIG. 5 is a cross-sectional view showing the fixing section of FIG. 4.
Figure 4:
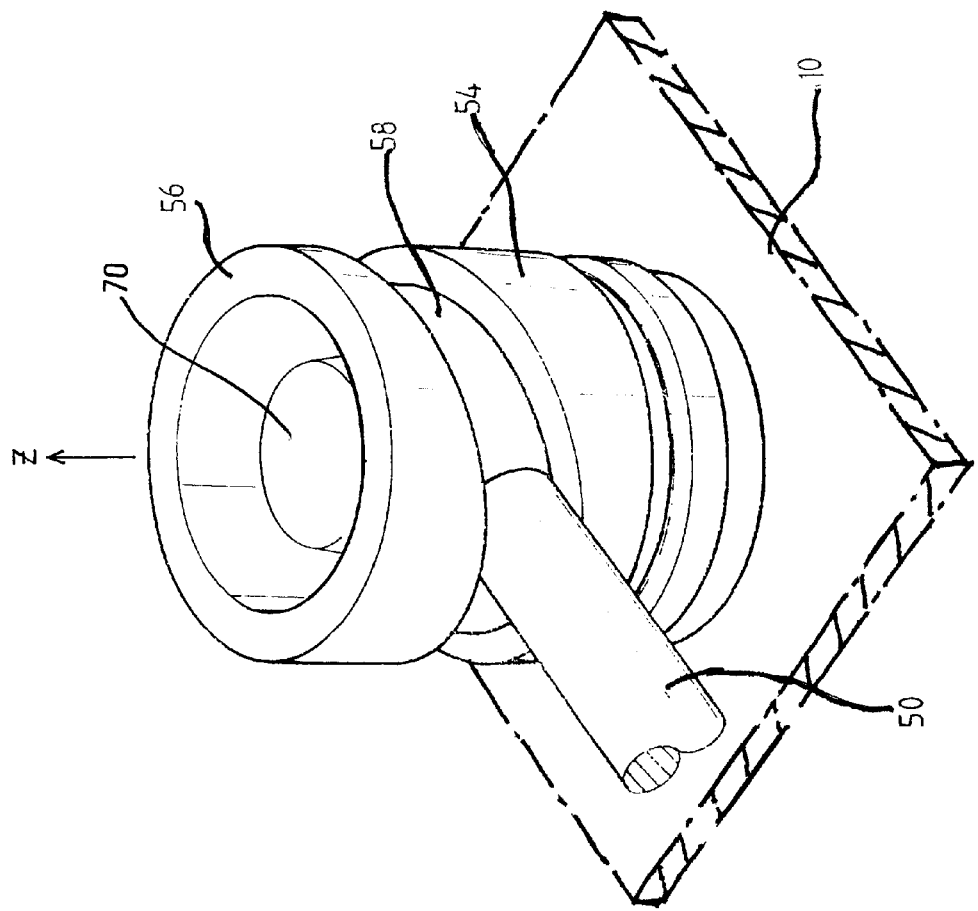
FIG. 4 is an enlarged perspective view showing a fixing section of FIG. 3.

FIGS. 3 to 5 show an optical pick-up feeding device according to an embodiment of the present invention. In FIG. 3, the optical pick-up feeding device according to the embodiment of the present invention is movably installed on a longitudinal opening 10a of a deck base 10. The optical pick-up feeding device further includes an optical pick-up device 16 for recording/reproducing data to/from an optical disc (not shown), a feeding section for feeding the optical pick-up device 16, a guiding section for guiding the optical pick-up device 16, and an adjusting section mounted on the deck base 10 for adjusting the guiding section, thereby adjusting an optical axis of optical pick-up device 16 to be vertical (perpendicular) with respect to a surface of optical disc.

The feeding section includes a lead screw 60 engaged with side of the optical pick-up device 16, and a stepping motor 62 installed on the deck base 10 for rotating the lead screw 60. One end of the lead screw 60 is rotatably engaged with a screw fixing member 66 fixed on the deck base 10 and another end thereof is engaged with the stepping motor 62. The stepping motor 62 is mounted on the deck base 10 by a bracket 64. When the lead screw 60 is rotated by the stepping motor 62, the optical pick-up device 16 is fed in radial direction of the optical disc.

The guiding section is installed on the deck base 10 in parallel with the lead screw 60. The guiding section includes a first and a second guide shafts 50 and 51 movably engaged with the optical pick-up device 16. The first guide shaft 50 is mounted on the deck base 10 as one end of the first guide shaft 50 is fixed by a guide fixing member 68, while other end thereof is engaged with the adjusting section. The second guide shaft 51 is mounted on the deck base 10 by a guide bracket 52, with both ends engaged with the adjusting section.

The adjusting section engaged with the guide shafts 50 and 51 of the guiding section and adjusts levels of the guide shafts 50 and 51, thereby adjusting an optical axis of the optical pick-up device 16 to be perpendicular with respect to a surface of the optical disc. The adjusting section is also capable of adjusting the first and second guide shafts 50 and 51 to be parallel with the lead screw 60. As shown in FIGS. 4 and 5, the adjusting section includes first adjusting holders 54 rotatably mounted on the deck base 10, and second adjusting holders 56 engaged with the first adjusting holders 54 by screws 70. The first and second adjusting holders 54 and 56 have cylindrical shape forming adjusting holes 58 therebetween into which an end of the first guide shaft 50, and both ends of the second guide shaft 51 are respectively inserted. The adjusting holes 58 have a spiral shape. When the first and second adjusting holders 54 and 56 are rotated, the guide shaft 50 or 51 is raised or lowered in a vertical (perpendicular) direction, that is, in Z-direction. (See FIG. 4.)

When the optical axis of the optical pick-up device 16 is not perpendicular with respect to the surface of the optical disc, the optical axis of the optical pick-up device 16 is adjusted by the adjusting section as shown in FIGS. 4 and 5. First, the first guide shaft 50 is adjusted to be perpendicular with respect to the surface of the optical disc. When the first and second adjusting holders 54 and 56 engaged with the first and second guide shafts 50 and 51 are rotated, the first and second guide shafts 50 and 51 are raised and lowered in the Z-axis direction shown in FIG. 4 by movement of the first and second adjusting holders 54 and 56. By doing so, the optical axis of the optical pick-up device 16 is adjusted to be perpendicular with respect to the surface of the optical disc.

Additionally, the first guide shaft 50 can be parallel with the lead screw 60 and the second guide shaft 51 can be parallel with the first guide shaft 50 through the above process.

Figure 6:
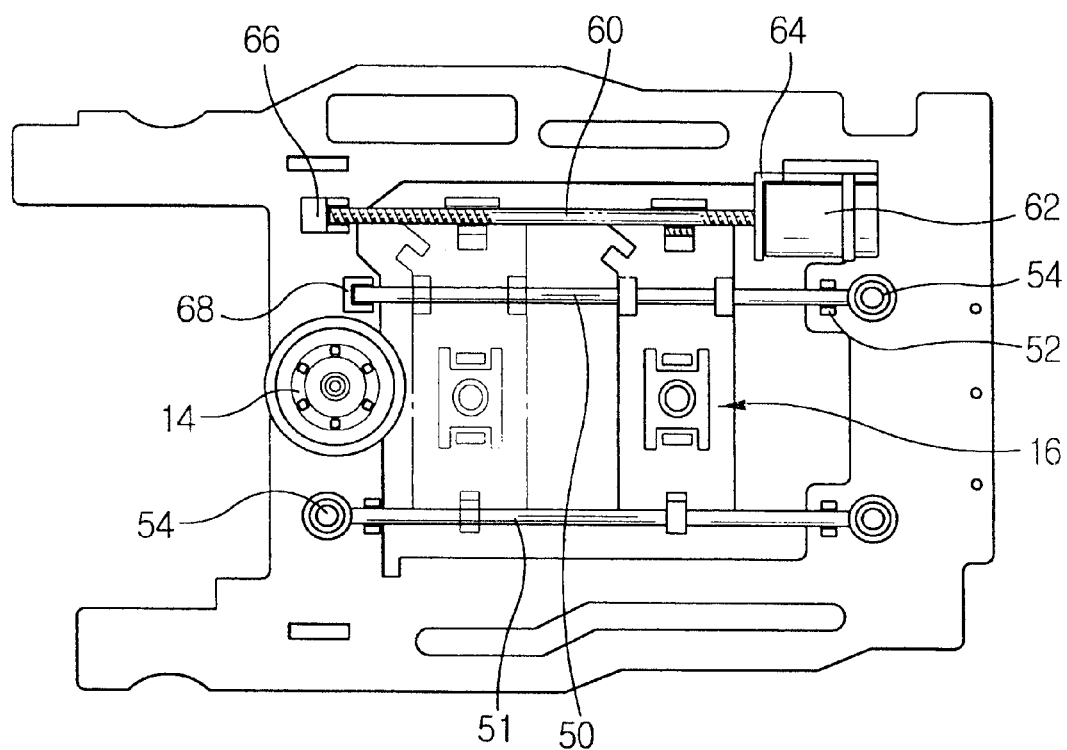
FIG. 6 is a plan view illustrating an operation of the optical pick-up feeding device according to the embodiment of the present invention.
Figure 7:
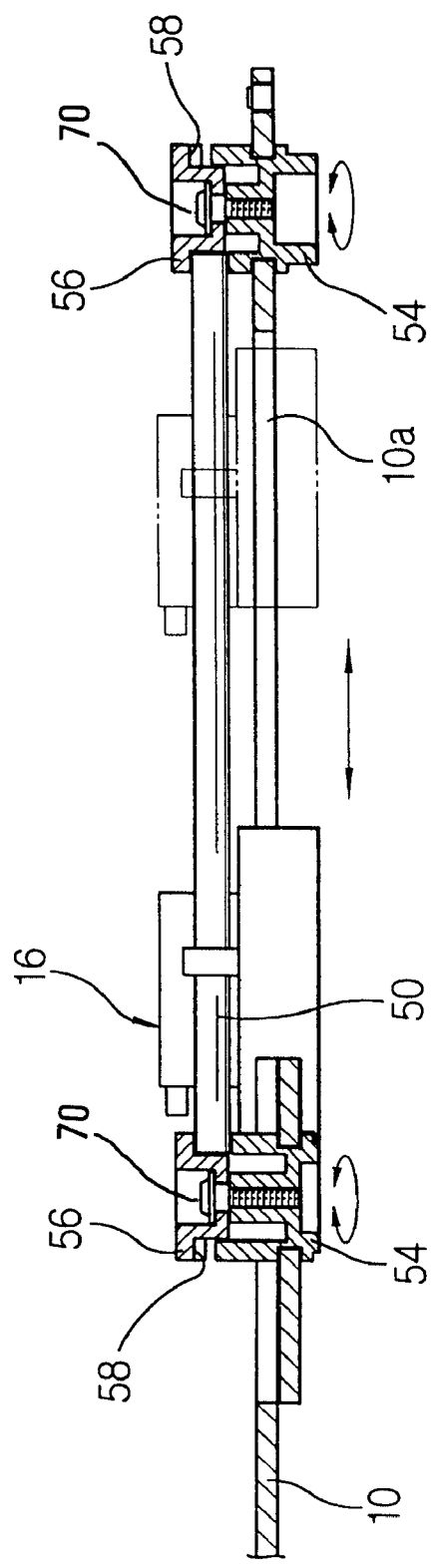
FIG. 7 is a cross-sectional view illustrating the operation of the optical pick-up feeding device according to the embodiment of the present invention.

In this manner, when the optical axis of the optical pick-up device 16 is perpendicular with respect to the surface of the optical disc, as shown in FIGS. 6 and 7, the stepping motor 62 is driven so that the optical pick-up device 16 is fed along the guide shafts 50 and 51 by the lead screw 60. At this time, since the optical axis of the optical pick-up device 16 is perpendicular with respect to the surface of the optical disc, the laser beam from the optical pick-up device 16 is perpendicularly projected on the surface of the optical disc and since the lead screw 60 is directly engaged with the stepping motor 62, there is no vibration of the optical pick-up device 16 during feeding process thereof until it is finally positioned at the exact position by the stepping motor 62. The lead screw 60 may be press-fitted into a rotor of the stepping motor 62.

According to the present invention described as above, the optical axis of optical pick-up device is adjusted to be perpendicular with respect to the surface of the optical disc, the guide shafts for guiding the optical pick-up device is easily adjusted to be parallel with the lead screw, and the optical pick-up device is accurately positioned at the expected position to access the optical disc.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An apparatus for feeding an optical pick-up device in a radial direction of an optical disc so as to project a light beam on the optical disc to record and/or reproduce information from the optical disc, the apparatus comprising:

a deck base;

said optical pick-up device installed on said deck base, to record and/or reproduce the information to and/or from the optical disc;

means engaged with a side of said optical pick-up device, for feeding said optical pick-up device in the radial direction;

means movably engaged with said optical pick-up device for guiding said optical pick-up device in the radial direction; and means mounted on said deck base, for adjusting ends of an element of said guiding means in a same direction such that said guiding means is substantially parallel with said feeding means, and an optical axis of said optical pick-up device is substantially perpendicular with respect to a surface of the optical disc.

2. The apparatus as claimed in claim 1, wherein said guiding means comprises a pair of guide shafts spaced in a substantially parallel relationship with each other on said deck base, one of the guide shafts includes the element having the ends moved by said adjusting means, and said optical pick-up device is movably engaged with said guide shafts.

3. The apparatus as claimed in claim 2, wherein said guiding means further comprises brackets to mount said guide shafts on said deck base.

4. The apparatus as claimed in claim 1, wherein said adjusting means comprises:

a plurality of first adjusting holders rotatably mounted on said deck base; and a plurality of second adjusting holders respectively coupled with said first adjusting holders, wherein said respectively coupled first and second adjusting holders respectively define adjusting holes therebetween into which the corresponding ends of the element of said guiding means are inserted.

5. The apparatus as claimed in claim 4, wherein each of said first and second adjusting holders is a cylinder having a base and a surface oblique to said base, and the oblique surface of each first adjusting holder faces the oblique surface of said respective second adjusting holder.

6. The apparatus as claimed in claim 4, wherein said adjusting means further comprises a plurality of screws to respectively engage the first adjusting holders and the respective second adjusting holders through the axes of rotation of the respective first and second adjusting holders.

7. The apparatus as claimed in claim 1, wherein said feeding means comprises:

a lead screw engaged with the side of said optical pick-up device, to feed said optical pick-up device in the radial direction; and a stepping motor to rotate said lead screw.

8. An apparatus for feeding an optical pick-up device in a radial direction of an optical disc so as to project a light beam on the optical disc to record and/or reproduce information from the optical disc, the apparatus comprising:

a deck base;

said optical pick-up device installed on said deck base, to record and/or reproduce the information to and/or from the optical disc;

means engaged with a side of said optical pick-up device, for feeding said optical pickup device in the radial direction;

means movably engaged with said optical pick-up device for guiding said optical pick-up device in the radial direction; and means mounted on said deck base, for adjusting said guiding means such that said guiding means is substantially parallel with said feeding means, and an optical axis of said optical pick-up device is substantially perpendicular with respect to a surface of the optical disc, wherein said guiding means comprises a pair of guide shafts spaced in a substantially parallel relationship with each other on said deck base, and said optical pick-up device is movably engaged with said guide shafts, said adjusting means comprises:

a plurality of first adjusting holders rotatably mounted on said deck base; and a plurality of second adjusting holders respectively coupled with said first adjusting holders, wherein said respectively coupled first and second adjusting holders respectively define adjusting holes therebetween into which one end of one of said guide shafts, and both ends of the other one of said guide shafts are respectively inserted.

9. The apparatus as claimed in claim 8, wherein each of said first and second adjusting holders have a cylindrical shape, and each of the adjusting holes is formed in a spiral shape.

10. An apparatus for feeding an optical pick-up device in a radial direction of an optical disc so as to project a light beam on the optical disc mounted on a turntable to record and/or reproduce information from the optical disc, the apparatus comprising:

a deck base on which said turntable is mounted;

a transmissionless feeding unit mounted on said deck base and movably engaging the optical pick-up device, to drive the optical pick-up device in the radial direction without vibration;

a guide unit including a shaft mounted on said deck base, to guide the optical pick-up device in the radial direction; and an adjusting unit mounted on said deck base, to adjust ends of the shaft of said guide unit in a common direction to adjust a position of said guide unit, thereby adjusting an optical axis of the light beam on the optical disc.

11. The apparatus as claimed in claim 10, wherein said adjusting unit adjusts portions of the guide unit in a direction perpendicular to a surface of the optical disc.

12. The apparatus as claimed in claim 10, wherein:

said guide unit includes a first guide shaft extending substantially in the radial direction, a first side of the optical pick-up device being movably engaged with said first guide shaft; and said adjusting unit includes a first adjusting holder rotatably mounted on said deck base, and a second adjusting holder coupled with said first adjusting holder, wherein said first and second adjusting holders define a spiral adjusting hole therebetween into which an end of said first guide shaft is inserted;

wherein rotation of said first and second adjusting holders moves the end of said first guide shaft in a direction perpendicular to the surface of the optical disc.

13. The apparatus as claimed in claim 12, wherein each of said first and second adjusting holders is a cylinder having a base and a surface oblique to said base, and the oblique surface of said first adjusting holder faces the oblique surface of said second adjusting holder.

14. The apparatus as claimed in claim 12, wherein said feeding unit comprises:

a lead screw engaged with the optical pick-up device and extending substantially parallel to the radial direction and said first guide shaft; and a motor to rotate the lead screw.

15. The apparatus as claimed in claim 10, wherein said feeding unit comprises
 a stepping motor mounted on said deck base; and
 a lead screw engaged with a side of the optical pickup device and directly engaged with the stepping motor so as to move the optical pick-up device without vibration.

16. An apparatus for feeding an optical pick-up device in a radial direction of an optical disc so as to project a light beam on the optical disc mounted on a turntable to record and/or reproduce information from the optical disc, the apparatus comprising:
 a deck base on which said turntable is mounted;
 a transmissionless feeding unit mounted on said deck base and movably engaging the optical pick-up device, to drive the optical pick-up device in the radial direction without vibration;
 a guide unit mounted on said deck base, to guide the optical pick-up device in the radial direction; and
 an adjusting unit mounted on said deck base, to adjust a position of said guide unit, thereby adjusting an optical axis of the light beam on the optical disc,
 wherein:
  said guide unit includes a first guide shaft extending substantially in the radial direction, a first side of the optical pick-up device being movably engaged with said first guide shaft; and
  said adjusting unit includes
   a first adjusting holder rotatably mounted on said deck base, and
   a second adjusting holder coupled with said first adjusting holder, wherein said first and second adjusting holders define a spiral adjusting hole therebetween into which an end of said first guide shaft is inserted;
  wherein rotation of said first and second adjusting holders moves the end of said first guide shaft in a direction perpendicular to the surface of the optical disc,
  said guide unit further includes a second guide shaft extending substantially parallel to said first guide shaft and substantially in the radial direction, a second side of the optical pick-up device being movably engaged with said second guide shaft; and
  said adjusting unit includes
   a pair of third adjusting holders rotatably mounted on said deck base, and
   a pair of fourth adjusting holders respectively coupled with said third adjusting holders, wherein said respective third and fourth adjusting holders define respective spiral adjusting holes therebetween into which each end of said second guide shaft is inserted;
  wherein rotation of said third adjusting holders and the respective fourth adjusting holders moves the respective ends of said second guide shaft in the direction perpendicular to the surface of the optical disc.

17. The apparatus as claimed in claim 16, wherein each of said third and fourth adjusting holders is a cylinder having a base and a surface oblique to said base, and the oblique surface of each of the third adjusting holders faces the oblique surface of said respective fourth adjusting holder.

18. The apparatus as claimed in claim 16, wherein said feeding unit comprises:
 a lead screw engaged with the optical pick-up device and extending substantially parallel to the radial direction and said first and second guide shafts; and
 a motor to rotate the lead screw.

19. An apparatus for feeding an optical pick-up device in a radial direction of an optical disc so as to project a light beam on the optical disc mounted on a turntable to record and/or reproduce information from the optical disc, the apparatus comprising:
 a deck base on which said turntable is mounted;
 a feeding unit mounted on said deck base and movably engaging the optical pick-up device, to drive the optical pick-up device in the radial direction;
 a guide unit mounted on said deck base, to guide the optical pick-up device in the radial direction; and
 an adjusting unit mounted on said deck base, to adjust a position of said guide unit, thereby adjusting an optical axis of the light beam on the optical disc,
 wherein said adjusting unit adjusts ends of an element of said guide unit to adjust the position of said guide unit to be parallel with said feeding unit.

20. An apparatus for feeding an optical pick-up device in a radial direction of an optical disc so as to project a light beam on the optical disc mounted on a turntable to record and/or reproduce information from the optical disc, the apparatus comprising:
 a deck base on which said turntable is mounted;
 a feeding unit mounted on said deck base and having a shaft engaging the optical pick-up, to drive the optical pick-up device in the radial direction;
 a guide unit mounted having guide shafts extending substantially parallel to each other and movably engaging the optical pick-up device, to guide the optical pick-up device in radial direction; and
 an adjusting unit mounted on said deck base, to adjust ends of one of the guide shafts in a direction perpendicular to a surface of the optical disc such that the guide shafts are substantially parallel with said shaft of the feeding unit.

* * * * *

UNITED STATES PATENT AND TRADEMARK OFFICE
CERTIFICATE OF CORRECTION

PATENT NO.    : 6,445,673 B2
DATED         : September 3, 2002
INVENTOR(S)   : Hee-Deuk Park It is certified that error appears in the above-identified patent and that said Letters Patent is hereby corrected as shown below:

Column 8,
Line 33, after "unit" (first occurrence) insert -- in a same direction --.
Line 50, after "in a" insert -- same --.

Signed and Sealed this

Twenty-fifth Day of February, 2003

JAMES E. ROGAN
*Director of the United States Patent and Trademark Office*